March 2, 1943. A. G. REYNOLDS 2,312,979
FLUID PUMP AND MOTOR MECHANISM
Filed Jan. 13, 1941 2 Sheets-Sheet 1
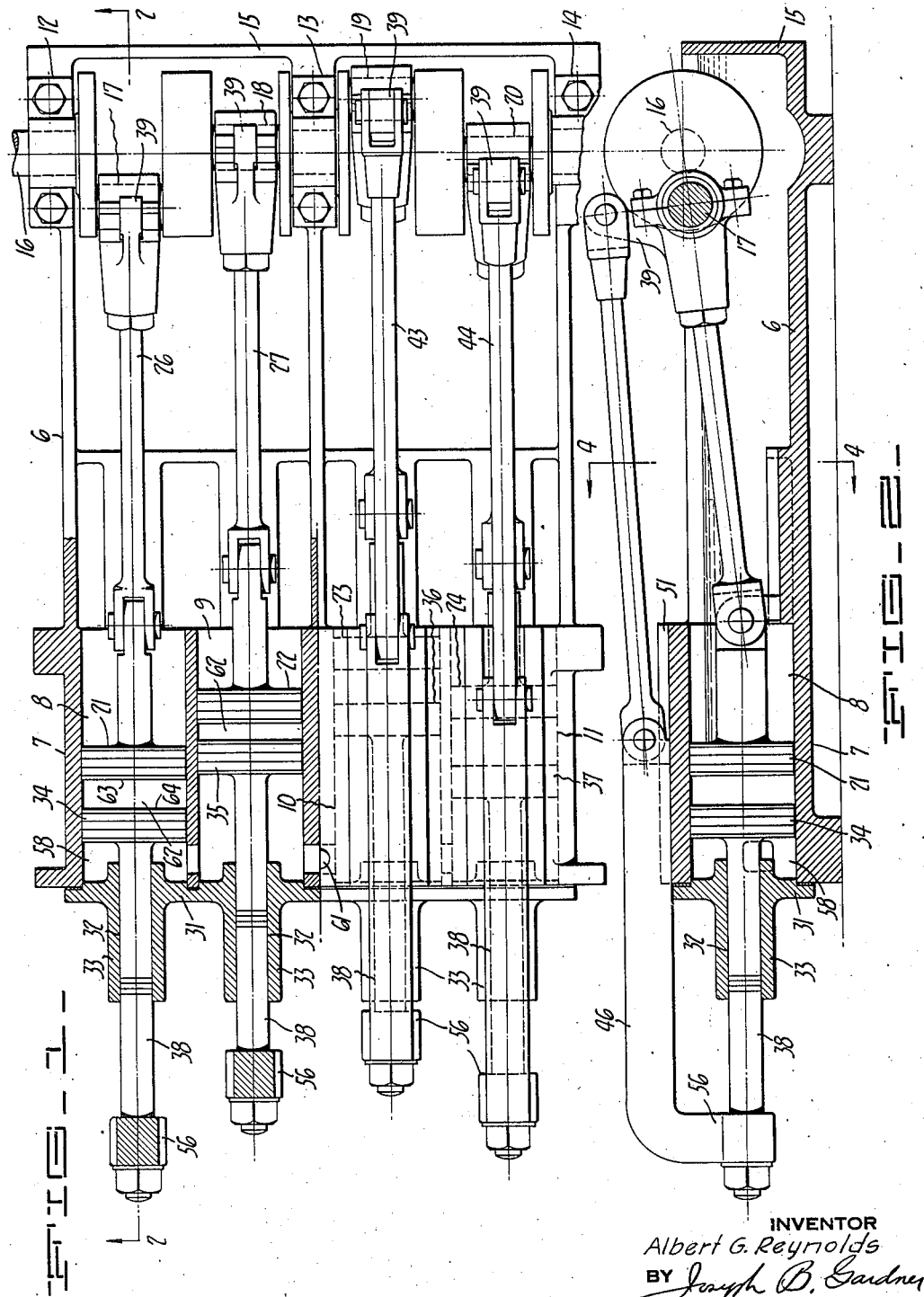
INVENTOR
Albert G. Reynolds
BY Joseph B. Gardner
his ATTORNEY March 2, 1943. A. G. REYNOLDS 2,312,979
FLUID PUMP AND MOTOR MECHANISM
Filed Jan. 13, 1941 2 Sheets-Sheet 2
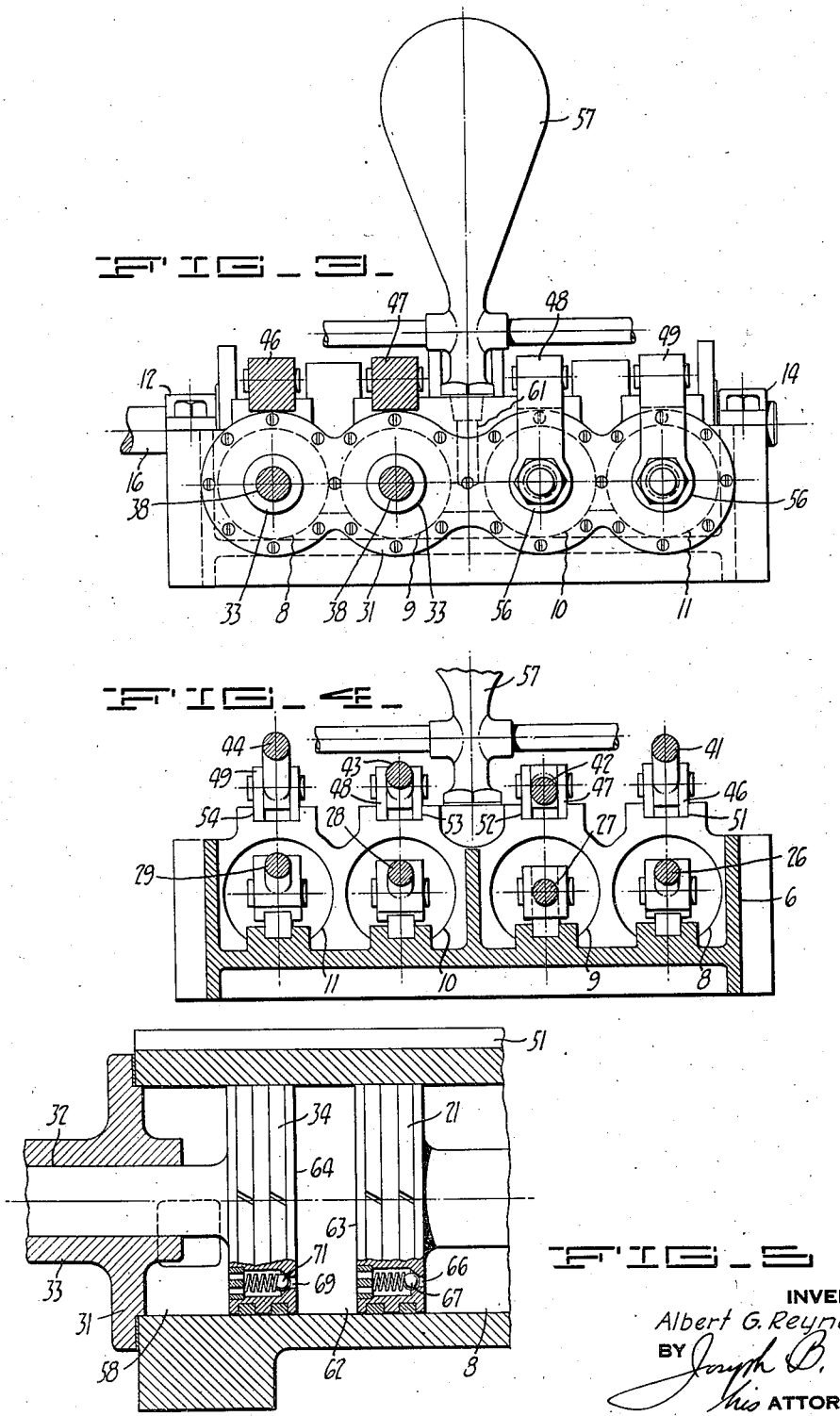

Patented Mar. 2, 1943

2,312,979

UNITED STATES PATENT OFFICE 2,312,979

FLUID PUMP AND MOTOR MECHANISM

Albert G. Reynolds, Oakland, Calif.

Application January 13, 1941, Serial No. 374,155

6 Claims. (Cl. 103—200)

The invention relates to fluid mechanisms such as cylinders, reciprocating pistons, etc., used in fluid motors and pumps.

An object of the invention is to provide a fluid mechanism of the character described which will be smooth, more efficient, and positive in its operation and which may be adapted for use as either a fluid motor or a fluid pump.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation partly in section, of the pump and motor of my invention.

Figure 2 is a sectional view taken on the line 2—2 of Figure 1.

Figure 3 is a head-end view of the pump with parts in section.

Figure 4 is a cross sectional view taken on the line 4—4 of Figure 2.

Figure 5 is an enlarged sectional view of a portion of one of the cylinders as shown in Figure 1.

The fluid mechanism of the present invention consists briefly in the combination of opposed reciprocating pistons operatively mounted within a fluid cylinder and an improved drive and connecting means for the pistons including a crank shaft and connecting rods and attaching means therefor for connecting both of the pistons to the crank shaft in a manner providing a smooth, efficient and positive relative displacement of the pistons relative to a rotary movement of the crank shaft. Suitable fluid inlet and discharge means are associated with the cylinder in conjunction with valve means for providing for the inlet and discharge of fluid upon relative displacement of the cylinders, the specific design and operation of the inlet and discharge passages and valve means being varied to obtain either the pump or motor operation.

Referring more specifically to the accompanying drawings, the fluid mechanism therein depicted consists of a casing 6 formed adjacent one end 7 thereof with a plurality of parallel substantially co-terminous cylinders 8, 9, 10, 11 and adjacent the opposite end 15 thereof with bearing portions 12, 13, 14, which are aligned along an axis at substantially right angles to the axes of cylinders 8—11. Carried in the bearings 12—14 is a crank shaft 16 having a plurality of throws 17, 18, 19, 20 equal in number to the number of the cylinders 8—11 and with the throws longitudinally aligned with the cylinders. As will be seen from the drawings, the crank throws 17—20 are successively circumferentially positioned in a 90° phase relationship.

Mounted in the cylinders 8—11 is a set of pistons, 21, 22, 23, 24 which are connected to the throws 17—20 of the crank shaft by means of a set of connecting rods 26, 27, 28 and 29 whereby a reciprocation of the pistons 21—24 will be accompanied by a rotary movement of the crank shaft 16. The ends of the cylinders 8—11 adjacent the end 7 of the casing are closed by an end closure plate 31 which is formed at each of the cylinders with a centrally positioned aligned bore 32 defined in an axially extending boss 33 on the plate. A second set of pistons 34, 35, 36 and 37 are mounted in the cylinders 8—11 between the pistons 21—24 and the end wall 31 whereby each cylinder is provided with a pair of opposed pistons such as pistons 21—34, as illustrated in Figure 1. Each of the pistons 34—37 is formed with an axially extending portion 38 which is slidably carried in the bore 32 so as to seal the end wall of the casing.

Means for reciprocating the set of pistons 34—37 relative to pistons 21—24 here include a member 39 secured to each of the connecting rods 26—29 and extending at substantially right angles therefrom, as viewed in the plane of rotation of the crank shaft as illustrated in Figure 2. These members are connected at a point spaced from the connecting rods 26—29 by a second set of connecting rods 41, 42, 43 and 44, the latter being in turn connected to slide members 46, 47, 48, 49 mounted in guide grooves 51, 52, 53 and 54 on the top of the casing 6 over the cylinders and connected at their opposite ends 56 to the axially extending part 38 of the pistons 34—37. In this manner upon rotation of the crank shaft 16, each pair of pistons in the cylinder, for example pistons 21 and 34, will be carried together in a reciprocal movement wherein relative axial displacement between the pistons is simultaneously effected.

A fluid pressure reservoir, here in the form of an air dome 57, is connected to each of the cylinders 8—11 adjacent the end 7 thereof and into the space 58 between the end 59 of pistons 34—37 and the end wall 31. Where the apparatus is used as a pump as here shown, the passage 61 connecting the air dome 57 with the ends of the cylinder serves as a discharge passage for each of the cylinders. When the apparatus is used as a pump, fluid is introduced into the chamber 62 defined between the opposed ends 63 and 64 of the pistons during the period of separation of the pistons and is discharged from the chamber 62 into the end space or chamber 58 during the period of movement of the pistons towards each other. Fluid is here introduced into the chamber 62 by way of a passage 66 through pistons 21—24, the supply of liquid or fluid here being illustrated as a body covering at least part of the vertical dimension of the casing whereby the fluid will flow without any appreciable head into the chamber 62. A suction check valve 67 is provided in each of the pistons 21—24 in the passage 66 so that upon reduction of pressure in the chamber 62, the valves 67 will automatically open to admit liquid into the chamber. The opposite piston, 34—37, is formed with an axial passage therethrough which is communicated with a side passage 69 to the end space 58 and a pressure discharge check valve 71 is mounted in this passage so as to automatically open upon increase of pressure in chamber 62 above the pressure of the space 58 and to automatically close upon reduction of pressure in chamber 62 below the pressure in space 58.

In accordance with the foregoing, it will be now understood that upon rotation of the crank shaft 16, the pistons in each of the cylinders will be caused to reciprocate relative to the cylinder and relative to each other so that during the course of each cycle, the chamber 62 will be subjected to an expansion and contracting action, thereby drawing liquid into the chamber through passage 66 and ejecting the same through passage 69. During such reciprocation, it will be understood that the pistons 34—37 are constantly urged in the direction of the opposite pistons and towards the crank shaft by reason of the constant pressure source 57. Due to this arrangement and to the crank shaft and connecting rod construction, a very smooth, powerful, positive and efficient operation of the apparatus is obtained.

While the apparatus is illustrated in the drawing for use as a pump, it will be readily understood that the reciprocating piston and drive therefor disclosed, may with equal facility be used as a fluid motor. To accomplish such a result, it is only necessary to change the construction of valves 67 and 71 so that the same will serve as discharge and inlet valves respectively and to additionally provide a suitably timed valve operating mechanism for opening and closing these valves in proper timed relation to the reciprocation of the pistons. In such case, the pressure reservoir 57 is used as a source of power and the energy represented by the fluid pressure stored therein or supplied thereto, is transmitted by the apparatus into mechanical rotating energy at the crank shaft.

I claim:

1. A fluid mechanism of the character described, comprising, a casing providing a cylinder, a pair of pistons, reciprocally mounted in said cylinder in opposed relation defining a fluid chamber therebetween, a crank shaft, a connecting rod connecting said crank shaft to one of said pistons, a member secured to said connecting rod and extending at substantially right angles therefrom in the plane of rotation of said crank shaft, a connecting rod connecting said other piston to said member at a position spaced from said first rod to provide relative displacement of said pistons upon rotation of said crank shaft, and inlet and discharge passages connected to said chamber and valve means associated with said passages for admitting and discharging fluid upon relative displacement of said pistons.

2. A reciprocative movement mechanism for a fluid motor or pump or the like having a cylinder and opposed reciprocating pistons mounted therein, a crank shaft, a connecting rod connecting said crank shaft to one of said pistons, a member secured to said connecting rod and extending at substantially right angles therefrom in the plane of rotation of said crank shaft, and a connecting rod connecting the other of said pistons to said member at a position spaced from said first rod to provide relative displacement of said pistons relative to a rotary movement of said crank shaft.

3. A fluid mechanism of the character set forth in claim 2 wherein the axis of extension of said member from said first connecting rod substantially intersects the point of connection of said first connecting rod with said crank shaft.

4. A fluid mechanism of the character described comprising, a casing providing a cylinder having open and closed ends, a crank shaft mounted on said casing opposite the open end of said cylinder and having its axis of rotation at substantially right angles to the axis of said cylinder, a piston reciprocally mounted in said cylinder, a connecting rod connecting said piston and crank shaft through the open end of said cylinder, a second piston reciprocally mounted in said cylinder in opposed relation to said first piston and positioned between said first piston and said closed cylinder end and defining a fluid chamber between said pistons, pressure reservoir means connected to the closed end of said cylinder whereby said second piston will be constantly urged by the fluid pressure in said means towards said first piston, a member secured to said connecting rod and extending at substantially right angles therefrom in the plane of rotation of said crank shaft, a connecting rod connecting said second named piston to said member at a position spaced from said first connecting rod to provide relative displacement of said pistons relative to a rotary movement of said crank shaft, and inlet and discharge passages connected to said chamber and valve means associated with said passages for admitting and discharging fluid upon relative displacement of said pistons.

5. A fluid pump comprising, a casing providing a cylinder having open and closed ends, a crank shaft mounted on said casing opposite the open end of said cylinder and having the axis of rotation thereof extending at substantially right angles to the axis of said cylinder, said closed cylinder end having a central bore therethrough aligned with said cylinder axis, a piston reciprocally mounted in said cylinder, and a connecting rod extending through the open end of said cylinder and connecting said piston and said crank shaft, a second piston reciprocally mounted in said cylinder between said first piston and said closed cylinder end and formed with an axial extension reciprocally mounted in said bore, a member secured to said connecting rod and extending at substantially right angles therefrom in the plane of rotation of said crank shaft, a cross head carried by said casing in alignment with said cylinder and connected to said extension, a connecting rod connecting said cross head to said member at a position spaced from said first connecting rod to provide relative displacement of said pistons relative to a rotary movement of said crank shaft, a fluid pressure reservoir connected to said cylinder at the closed end thereof to constantly urge said second piston toward said first piston, a fluid inlet passage connected to the chamber between said pistons, a fluid discharge passage connecting said chamber with said space, and valve means associated with said passages for admitting and discharging fluid upon relative displacement of said pistons.

6. A fluid mechanism of the character described comprising, a casing providing a plurality of parallel and coterminous cylinders provided with adjacent open and closed ends, a crank shaft supported on said casing opposite the open ends of said cylinders and having an axis of rotation arranged at substantially right angles to the axes of said cylinders and formed with a plurality of throws equal in number to the number of said cylinders with the adjacent successive throws positioned in a 90° phase relationship, the closed end of each of said cylinders being formed with an axial bore therethrough, a piston reciprocally mounted in each of said cylinders, connecting rods extending through the open ends of said cylinders connecting said pistons to said crank throws, a second piston reciprocally mounted in each of said cylinders between the closed end thereof and said first piston and each formed with an axial extension reciprocally mounted in said bore, a member secured to each of said connecting rods and extending at substantially right angles therefrom in the plane of rotation of said crank shaft, cross heads carried by said casing in alignment with said cylinders and connected to said extensions, connecting rods connecting said cross heads with said members in spaced relation to said first connecting rods to provide relative displacement between each pair of pistons in each of said cylinders relative to a rotary movement of said crank shaft, a fluid pressure reservoir connected to said cylinders at the closed ends thereof and constantly urging said second pistons longitudinally in said cylinders in the direction of said crank shaft and said first pistons, fluid passage means connected to the chamber defined between the pistons in each cylinder and between said chambers and the closed ends of said cylinders, and valve means associated with said passage means and providing for the inlet and discharge of fluid upon relative displacement of said pistons.

ALBERT G. REYNOLDS.